US007297428B2

(12) United States Patent
Saulsbury et al.

(10) Patent No.: US 7,297,428 B2
(45) Date of Patent: Nov. 20, 2007

(54) REGISTRATION ARRANGEMENT FOR FUEL CELL ASSEMBLIES

(75) Inventors: Kim B. Saulsbury, Lake Elmo, MN (US); Mary R. Boone, West Saint Paul, MN (US); Dennis P. O'Brien, Maplewood, MN (US); Dennis E. Ferguson, Mahtomedi, MN (US); Paul M. Boucher, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 439 days.

(21) Appl. No.: 10/699,454

(22) Filed: Oct. 31, 2003

(65) Prior Publication Data

US 2005/0095484 A1  May 5, 2005

(51) Int. Cl.
*H01M 8/10* (2006.01)
*H01M 2/14* (2006.01)
*H01M 2/00* (2006.01)
*H01M 4/82* (2006.01)
*B23P 19/00* (2006.01)

(52) U.S. Cl. .............................. 429/32; 429/38; 429/39; 429/34; 429/30; 429/33; 29/623.1; 29/730

(58) Field of Classification Search ................ None
See application file for complete search history.

(56) References Cited

U.S. PATENT DOCUMENTS

| 3,278,336 A | 10/1966 | Uline et al. |
| 3,516,866 A | 6/1970 | Warszawski |
| 4,615,107 A | 10/1986 | Kumeta et al. |
| 4,719,157 A | 1/1988 | Tsutsumi et al. |
| 5,009,968 A | 4/1991 | Guthrie et al. |
| 5,484,666 A * | 1/1996 | Gibb et al. ................... 429/34 |
| 5,629,104 A | 5/1997 | Crawford, Sr. et al. |
| 5,945,232 A | 8/1999 | Ernst et al. |
| 5,976,725 A * | 11/1999 | Gamo et al. .................. 429/25 |
| 6,270,917 B1 | 8/2001 | Maeda et al. |
| 6,344,290 B1 | 2/2002 | Bossel |
| 6,348,280 B1 | 2/2002 | Maeda et al. |
| 6,358,641 B1 * | 3/2002 | Mease ......................... 429/34 |
| 6,620,540 B2 * | 9/2003 | Sugita et al. ................. 429/34 |
| 6,936,367 B2 | 8/2005 | Sarkar et al. |
| 2002/0034673 A1 | 3/2002 | Bisaka et al. |
| 2002/0110722 A1 | 8/2002 | Yang |
| 2003/0059662 A1 | 3/2003 | Debe et al. |
| 2003/0152819 A1 | 8/2003 | Hatoh et al. |
| 2003/0162080 A1 | 8/2003 | DeAngeles et al. |

FOREIGN PATENT DOCUMENTS

EP    0 981 172 A2    2/2000

(Continued)

*Primary Examiner*—Dah Wei Yuan
*Assistant Examiner*—Karie O'Neill
(74) *Attorney, Agent, or Firm*—Mark A. Hollingsworth; Philip Y. Dahl

(57) ABSTRACT

A registration arrangement for a fuel cell stack assembly incorporates registration posts and registration apertures or recesses. Fuel cell assemblies of the stack may include first and second flow field plates and a membrane electrode assembly (MEA) having an active area. Registration apertures are defined in each of the MEA and the first and second flow field plates. The respective registration apertures are situated within non-active areas of the MEA when the first and second flow field plates and the MEA are in axial alignment. Registration posts are configured for reception within the registration apertures. Each of the registration posts has an outer surface differing in shape from a shape of the inner surface of the registration apertures. The inner surface of the registration apertures contact the outer surface of the registration posts at a plurality of discrete press-fit locations.

5 Claims, 11 Drawing Sheets

FOREIGN PATENT DOCUMENTS

| | | |
|---|---|---|
| EP | 1 094 536 A1 | 4/2001 |
| EP | 1 283 558 A2 | 2/2003 |
| EP | 1 304 756 A | 4/2003 |
| JP | 61-147472 | 7/1986 |
| JP | 1-281681 | 11/1989 |
| JP | 1-320777 | 12/1989 |
| JP | 6-13101 | 1/1994 |
| JP | 9-63629 | 3/1997 |
| JP | 09 134734 A | 5/1997 |
| JP | 9-151288 | 6/1997 |
| JP | 3-151611 | 5/2003 |
| KR | 2002-0056186 | 7/2002 |
| WO | WO 95/28010 | 10/1995 |
| WO | WO 98/21773 A | 5/1998 |
| WO | WO 01/03224 A1 | 1/2001 |
| WO | WO 01/13441 A2 | 2/2001 |
| WO | WO 02/09208 A2 | 1/2002 |
| WO | WO 02/065572 A2 | 8/2002 |
| WO | WO 03/012903 A1 | 2/2003 |

\* cited by examiner

REGISTRATION ARRANGEMENT FOR FUEL CELL ASSEMBLIES

FIELD OF THE INVENTION

The present invention relates generally to fuel cells and, more particularly, to registration arrangements for aligning fuel cell components and assemblies within a fuel cell stack.

BACKGROUND OF THE INVENTION

A typical fuel cell system includes a power section in which one or more fuel cells generate electrical power. A fuel cell is an energy conversion device that converts hydrogen and oxygen into water, producing electricity and heat in the process. Each fuel cell unit may include a proton exchange member at the center with gas diffusion layers on either side of the proton exchange member. Anode and cathode layers are respectively positioned at the outside of the gas diffusion layers.

The reaction in a single fuel cell typically produces less than one volt. A plurality of the fuel cells may be stacked and electrically connected in series to achieve a desired voltage. Electrical current is collected from the fuel cell stack and used to drive a load. Fuel cells may be used to supply power for a variety of applications, ranging from automobiles to laptop computers.

The efficacy of the fuel cell power system depends largely in part on the integrity of the various contacting and sealing interfaces within individual fuel cells and between adjacent fuel cells of the stack. Such contacting and sealing interfaces include those associated with the transport of fuels, coolants, and effluents within and between fuel cells of the stack. Proper positional alignment of fuel cell components and assemblies within a fuel cell stack is critical to ensure efficient operation of the fuel cell system.

SUMMARY OF THE INVENTION

The present invention is directed to a registration arrangement for a fuel cell stack assembly. According to one embodiment, a fuel cell stack assembly includes a number of fuel cell assemblies each comprising a first flow field plate, a second flow field plate, and a membrane electrode assembly (MEA) provided between the first and second flow field plates and having an active area. Registration apertures are defined in each of the MEA, the first flow field plate, and the second flow field plate. The respective registration apertures are situated within non-active areas of the MEA when the first and second flow field plates and the MEA are axially aligned within the stack assembly. Registration posts are configured for reception within the registration apertures. Each of the registration posts has an outer surface differing in shape from a shape of the inner surface of the registration apertures. The inner surface of the registration apertures contacts the outer surface of the registration posts at a plurality of discrete press-fit locations.

According to another embodiment, a fuel cell stack assembly includes a number of fuel cell assemblies each comprising a first and second flow field plates and an MEA provided between the first and second flow field plates and having an active area. Registration apertures are defined in each of the MEA, the first flow field plate, and the second flow field plate. The respective registration apertures are situated within non-active areas of the MEA when the first and second flow field plates and the MEA are axially aligned within the stack assembly. Registration posts are configured for reception within the registration apertures. Each of the registration posts has a length greater than a height of individual fuel cell assemblies, but less than a total height of the plurality of fuel cell assemblies defining the fuel cell stack assembly.

In accordance with a further embodiment, a fuel cell stack assembly includes a number of fuel cell assemblies each comprising first and second flow field plates and an MEA provided between the first and second flow field plates and having an active area. Registration apertures are defined in each of the MEA, the first flow field plate, and the second flow field plate. The respective registration apertures are situated within non-active areas of the MEA when the first and second flow field plates and the MEA are axially aligned within the stack assembly. Registration posts are configured for reception within the registration apertures. At least some of the registration apertures of the first flow field plates are configured to receive two registration posts, and at least some of the registration apertures of the second flow field plates are configured to receive one registration post.

According to another embodiment, a fuel cell sub-assembly for incorporation in a fuel cell stack assembly includes a flow field plate and an MEA positioned adjacent the flow field plate and having an active area. Registration apertures are defined in each of the flow field plate and the MEA. The respective registration apertures are situated within non-active areas of the MEA when the flow field plate and the MEA are in axial alignment. Registration posts are configured for reception within the registration apertures. Each of the registration posts has an outer surface differing in shape from a shape of the inner surface of the registration apertures. The inner surface of the registration apertures contacts the outer surface of the registration posts at a plurality of discrete press-fit locations.

In a further embodiment, a fuel cell stack assembly includes a number of fuel cell assemblies each comprising a first flow field plate, a second flow field plate, and an MEA provided between the first and second flow field plates and having an active area. Registration apertures are defined in each MEA. Registration recesses are molded into a first surface of each of the first and second flow field plates. Registration posts are molded into a second surface of each of the first and second flow field plates. The respective registration apertures, recesses, and posts are situated within non-active areas of the MEA when the first and second flow field plates and the MEA are axially aligned within the stack assembly. The registration posts of the first flow field plate extend through the registration apertures of the MEA and into the registration recesses of the second flow field plate of a first fuel cell assembly, respectively, and the registration posts of the second flow field plate of the first fuel cell assembly extend into the registration recesses of the first flow field plate of a second fuel cell assembly positioned adjacent the first fuel cell assembly.

According to another embodiment of the present invention, a method of forming a fuel cell stack assembly involves providing a first flow field plate, a second flow field plate, and an MEA having an active area. Registration apertures are defined in each of the MEA, the first flow field plate, and the second flow field plate. The method further involves aligning the first and second flow field plates and the MEA so that the respective registration apertures are in axial alignment. Registration posts are provided, each having an outer surface differing in shape from a shape of the inner surface of the registration apertures. The registration posts are inserted into the registration apertures so that the inner surface of the registration apertures contact the outer surface of the registration posts at a plurality of discrete press-fit locations.

In a further embodiment, a method of forming a fuel cell stack assembly involves providing a plurality of fuel cell assemblies each comprising a first flow field plate, a second flow field plate, and an MEA having an active area. Registration apertures are defined in each of the MEA, the first flow field plate, and the second flow field plate. The first and second flow field plates and the MEAs are aligned so that the respective registration apertures are in axial alignment. Registration posts are provided, each having a length exceeding a height of individual fuel cell assemblies. The method further involves inserting the registration posts into the registration apertures so that each of the registration posts extends through some but not all of the fuel cell assemblies defining the fuel cell stack assembly.

According to a further embodiment, a method of forming a fuel cell stack assembly involves providing a number of fuel cell assemblies each comprising a first flow field plate, a second flow field plate, and an MEA having an active area. Registration apertures are defined in each of the MEA, the first flow field plate, and the second flow field plate. The first and second flow field plates and the MEA are aligned so that the respective registration apertures are in axial alignment. Registration posts are provided. The method further involves inserting the registration posts into the registration apertures so that at least some of the registration apertures of the first flow field plates receive two registration posts, and at least some of the registration apertures of the second flow field plates receive one registration post.

In accordance with another embodiment, a method of forming a fuel cell stack assembly involves providing a number of fuel cell assemblies each comprising a first flow field plate, a second flow field plate, and an MEA having an active area. Registration apertures are defined in each MEA, and a number of registration recesses are molded into a first surface of each of the first and second flow field plates. A number of registration posts are molded into a second surface of each of the first and second flow field plates. The first and second flow field plates and the MEA are aligned so that the registration apertures, registration posts, and registration recesses are in axial alignment. The method further involves arranging first and second fuel cell assemblies of the fuel cell stack assembly so that the registration posts of the first flow field plate extend through the registration apertures of the MEA and into the registration recesses of the second flow field plate of the first fuel cell assembly, respectively, and the registration posts of the second flow field plate of the first fuel cell assembly extend into the registration recesses of the first flow field plate of the second fuel cell assembly positioned adjacent the first fuel cell assembly.

According to a further embodiment, registration apertures may be defined in an MEA at locations other than within non-active areas of the MEA. In general, registration apertures and registration posts may be situated anywhere on the MEA, but are preferably situated within non-active areas of the MEA. Although generally not desirable, one or more registration apertures, recesses, and/or posts may be situated within an active area of the MEA or a region that could otherwise be included within the active area of the MEA.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1A:
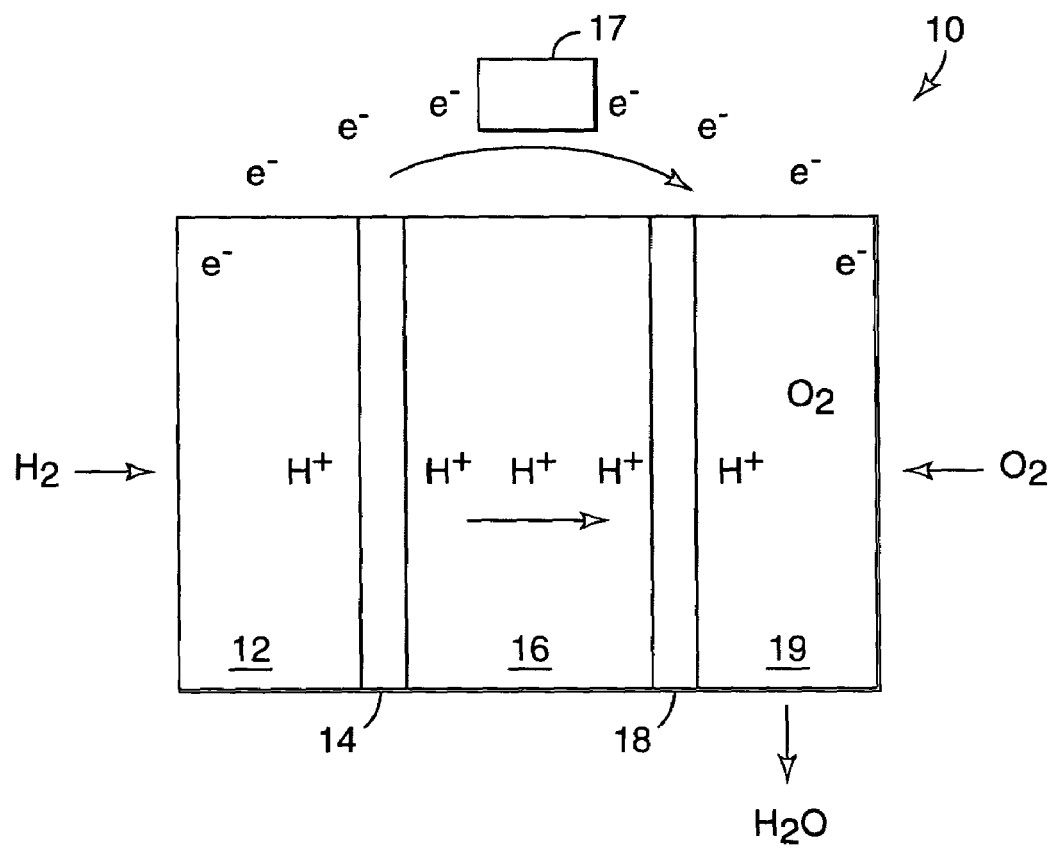
FIG. 1a is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to fuel cell assemblies incorporating a registration arrangement that provides for fuel cell assembly alignment within a fuel cell stack. Embodiments of the invention are directed to a registration approach that provides for intra-cell alignment of components within individual fuel cells and, in addition, inter-cell alignment between fuel cells of a fuel cell stack. The registration may also be applied to cell registration with end plates. Incorporating a registration approach according to the present invention advantageously simplifies fuel cell/ fuel cell stack component alignment, such as by obviating the need for separate registration arrangements for intra-cell alignment and inter-cell alignment.

According to one embodiment, each fuel cell assembly of a fuel cell stack includes a pair for flow field plates and a membrane electrode assembly (MEA) disposed there between. Registration apertures are provided in the flow field plates and MEAs of each fuel cell assembly of the stack. The registration apertures provided in the MEAs are situated at non-active locations of the MEAs. Registration posts are configured to contact an inner surface of the registration apertures at a number of discrete press-fit locations. An outer surface of the registration posts has a shape that differs from the inner surface of the registration apertures to achieve a press-fit contact interface between the registrations apertures and posts at two or more discrete locations. Installation of the registration posts within the registration apertures of the flow field plates and MEA of an individual fuel cell assembly provides inter-cell alignment of the MEA with respect to the pair of flow field plates.

Cell-to-cell alignment within a fuel stack is also accomplished through employment of a registration arrangement of the present invention. According to one approach, the registration posts that provide for intra-cell alignment of fuel cell components of a first fuel cell assembly also serve as a registration arrangement for an adjacently positioned second fuel cell. In one configuration, the registration posts are configured to protrude from the first fuel cell assembly and engage corresponding registration apertures of the second fuel cell assembly. The registration posts of the second cell assembly that provide intra-cell alignment of fuel cell components of the second fuel cell assembly are configured to engage corresponding registration apertures of a third fuel cell assembly. This registration approach may be employed for any number of fuel cell assemblies that define a fuel cell stack.

In another configuration, registration posts may be configured to provide intra-cell and inter-cell registration for two, three, of more fuel cell assemblies of the fuel cell stack. For example, a single set of registration posts may be employed to provide intra-cell and inter-cell registration for all fuel cell assemblies of the fuel cell stack. By way of further example, two, three, or more sets of registration posts may be employed to provide intra-cell and inter-cell registration for corresponding sets of fuel cell assemblies, referred to as multiple cell assemblies (MCAs). A first set of registration posts may be configured to provide intra-cell and inter-cell registration for two or three fuel cell assemblies (MCAs), and a second set of registration posts may be configured to provide intra-cell and inter-cell registration for an additional two or three fuel cell assemblies (MCAs). The two sets of fuel cell assemblies or MCAs in this illustrative example may be assembled to form a fuel cell stack, such that the registration posts of the first MCA register with corresponding registration apertures of the second MCA.

According to another configuration, registration posts may be configured to provide registration between fuel cell sub-assemblies. In one configuration, a first fuel cell sub-assembly may be defined to include a first flow field plate and a first MEA, with a first set of registration posts (e.g., two registration posts) positioned within corresponding registration apertures of the first flow field plate and the first MEA. A second fuel cell sub-assembly may be defined to include a second flow field plate, and a second MEA, with a second set of registration posts positioned within corresponding registration apertures of the second flow field plate and the second MEA. The second flow-field plate in this illustrative example may have a bipolar configuration, such that a first surface of the second flow-field plate can be situated adjacent the first MEA of the first fuel cell sub-assembly and a second surface of the second flow-field plate is situated adjacent the second MEA of the second fuel cell sub-assembly.

The first set of registration posts provides registration for the first flow field plate and the first MEA, and the second set of registration posts provides registration for the second flow field plate and the second MEA. The first set of registration posts are configured to engage registration apertures of the second fuel cell sub-assembly. The second set of registration posts may be configured to engage registration apertures of a third fuel cell sub-assembly. It can be appreciated that any number of fuel cell sub-assemblies may be constructed and assembled to define fuel cell stacks of any desired number of fuel cell assemblies. It is noted that the flow field plates defining the end of a fuel cell stack are typically configured as monopolar flow field plates.

According to another embodiment, registration posts and registration recesses are molded directly into the flow field plates. The registration posts of a first flow field plate align with, and pass through, registration apertures provided in a first MEA of a first fuel cell assembly. The registration posts are received by registration recesses of a second flow field plate. Registration posts of the second flow field plate provide a visually perceivable positioning and polarity (i.e., anode side vs. cathode side) identification feature for adding a second fuel cell assembly to the fuel cell stack. The registration posts of the second flow field plate of the first fuel cell assembly align with, and pass into, registration recesses of a first flow field plate of the second fuel cell assembly.

Registration posts of the first flow field plate align with, and pass through, registration apertures provided in a second MEA of a second fuel cell assembly. The registration posts are received by registration recesses of a second flow field plate of the second fuel cell assembly. The flow field plates may be configured as monopolar or bipolar plates, depending on the desired configuration of the fuel cell stack. The molded registration posts may have a shape the same as, or different from, that of the registration recesses to respectively provide for a continuous or discontinuous press-fit contact interface there between. The molded registration posts and recesses according to this embodiment provide for intra-cell and inter-cell registration of fuel cell assemblies and sub-assemblies of a fuel cell stack.

A fuel cell registration approach according to the present invention provides for readily discernable identification of anode and cathode flow field plates, which facilitates proper assembly of fuel cell assemblies within a fuel cell stack. The presence of protruding registration posts is readily discernable from the presence of registration recesses or apertures. Depending on the particular identification convention adopted, the anode or cathode plate of each fuel cell assembly may be identified by the presence of registration posts. The other of the anode and cathode plate may be identified by the presence of apertures/recesses. Positioning, alignment, and identification of fuel cell components may thus be facilitated by employment of a registration approach consistent with the principles of the present invention.

A registration methodology of the present invention may be incorporated in fuel cell assemblies and stacks of varying types, configurations, and technologies. A typical fuel cell is depicted in FIG. 1a. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

The fuel cell 10 shown in FIG. 1a includes a first fluid transport layer (FTL) 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1a, can be packaged as unitized fuel cell assemblies as described below. The unitized fuel cell assemblies, referred to herein as unitized cell assemblies (UCAs), can be combined with a number of other UCAs to form a fuel cell stack. The UCAs may be electrically connected in series with the number of UCAs within the stack determining the total voltage of the stack, and the active surface area of each of the cells determines the total current. The total electrical power generated by a given fuel cell stack can be determined by multiplying the total stack voltage by total current.

A number of different fuel cell technologies can be employed to construct UCAs in accordance with the principles of the present invention. For example, a UCA packaging methodology of the present invention can be employed to construct proton exchange membrane (PEM) fuel cell assemblies. PEM fuel cells operate at relatively low temperatures (about 175° F./80° C.), have high power density, can vary their output quickly to meet shifts in power demand, and are well suited for applications where quick startup is required, such as in automobiles for example.

The proton exchange membrane used in a PEM fuel cell is typically a thin plastic sheet that allows hydrogen ions to pass through it. The membrane is typically coated on both sides with highly dispersed metal or metal alloy particles (e.g., platinum or platinum/ruthenium) that are active catalysts. The electrolyte used is typically a solid perfluorinated sulfonic acid polymer. Use of a solid electrolyte is advantageous because it reduces corrosion and management problems.

Hydrogen is fed to the anode side of the fuel cell where the catalyst promotes the hydrogen atoms to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

A membrane electrode assembly (MEA) is the central element of PEM fuel cells, such as hydrogen fuel cells. As discussed above, typical MEAs comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Fluid transport layers (FTLs) facilitate gas transport to and from the anode and cathode electrode materials and conduct electrical current.

In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). The anode and cathode electrode layers may be applied to the PEM or to the FTL during manufacture, so long as they are disposed between PEM and FTL in the completed MEA.

Any suitable PEM may be used in the practice of the present invention. The PEM typically has a thickness of less than 50 μm, more typically less than 40 μm, more typically less than 30 μm, and most typically about 25 μm. The PEM is typically comprised of a polymer electrolyte that is an acid-functional fluoropolymer, such as Nafion® (DuPont Chemicals, Wilmington Del.) and Flemion® (Asahi Glass Co. Ltd., Tokyo, Japan). The polymer electrolytes useful in the present invention are typically preferably copolymers of tetrafluoroethylene and one or more fluorinated, acid-functional comonomers.

Typically, the polymer electrolyte bears sulfonate functional groups. Most typically, the polymer electrolyte is Nafion®. The polymer electrolyte typically has an acid equivalent weight of 1200 or less, more typically 1100, and most typically about 1000.

Any suitable FTL may be used in the practice of the present invention. Typically, the FTL is comprised of sheet material comprising carbon fibers. The FTL is typically a carbon fiber construction selected from woven and non-woven carbon fiber constructions. Carbon fiber constructions which may be useful in the practice of the present invention may include: Toray Carbon Paper, SpectraCarb Carbon Paper, AFN non-woven carbon cloth, Zoltek Carbon Cloth, and the like. The FTL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. The catalyst is typically applied to the PEM or to the FTL in the form of a catalyst ink. The catalyst ink typically comprises polymer electrolyte material, which may or may not be the same polymer electrolyte material which comprises the PEM.

The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols, polyalcohols, such a glycerin and ethylene glycol, or other solvents such as N-methylpyrrolidone (NMP) and dimethylformamide (DMF). The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the PEM or the FTL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120-190° F./49-88° C. A direct methanol fuel cell can be subject to UCA packaging in accordance with the principles of the present invention.

Figure 1B:
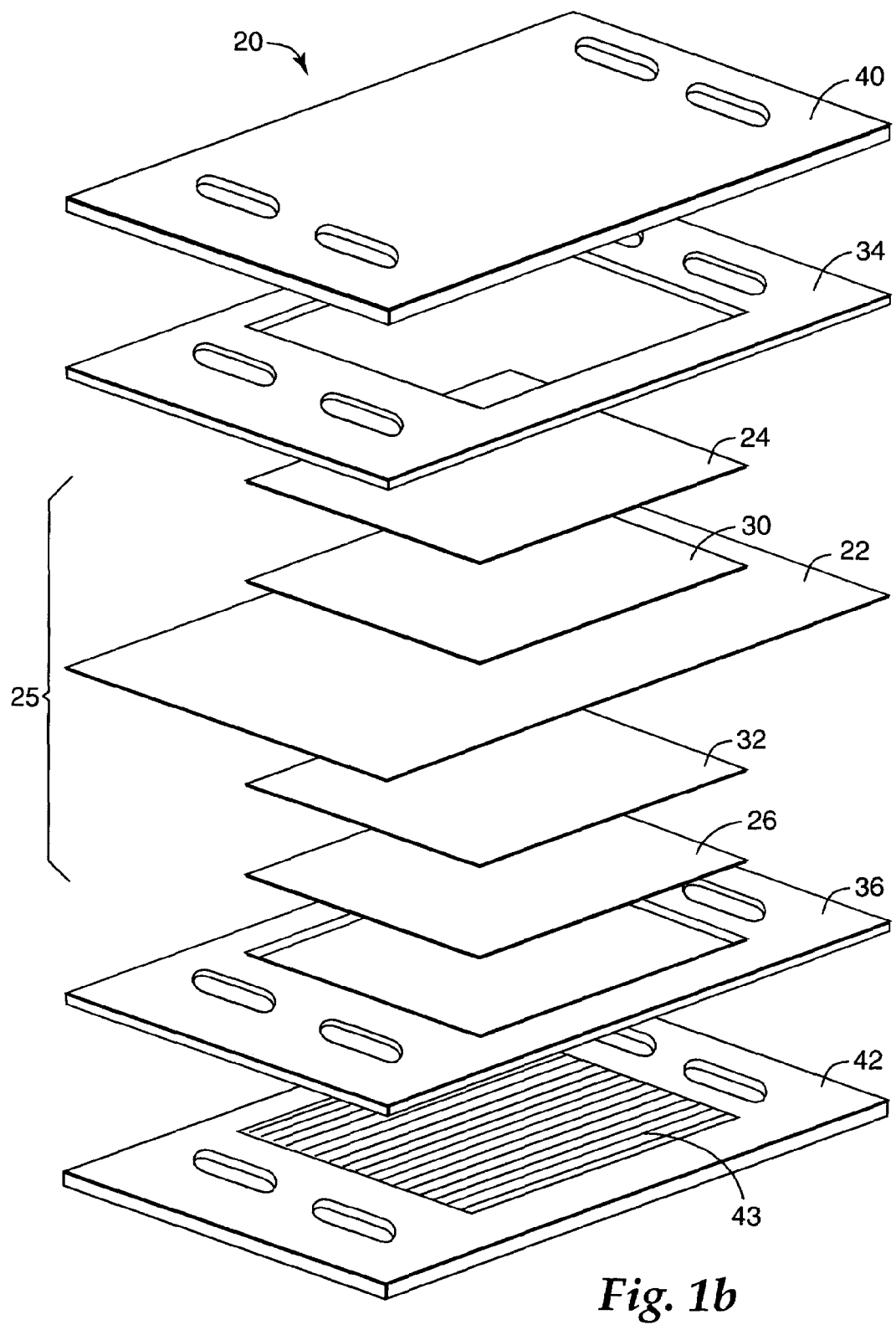
FIG. 1b illustrates a unitized cell assembly having a monopolar configuration in accordance with an embodiment of the present invention.

Referring now to FIG. 1b, there is illustrated an embodiment of a UCA implemented in accordance with a PEM fuel cell technology. As is shown in FIG. 1b, a membrane electrode assembly (MEA) 25 of the UCA 20 includes five component layers. A PEM layer 22 is sandwiched between a pair of fluid transport layers 24 and 26, such as diffuse current collectors (DCCs) or gas diffusion layers (GDLs) for example. An anode 30 is situated between a first FTL 24 and the membrane 22, and a cathode 32 is situated between the membrane 22 and a second FTL 26.

In one configuration, a PEM layer 22 is fabricated to include an anode catalyst coating 30 on one surface and a cathode catalyst coating 32 on the other surface. This structure is often referred to as a catalyst-coated membrane or CCM. According to another configuration, the first and second FTLs 24, 26 are fabricated to include an anode and cathode catalyst coating 30, 32, respectively. In yet another configuration, an anode catalyst coating 30 can be disposed partially on the first FTL 24 and partially on one surface of the PEM 22, and a cathode catalyst coating 32 can be disposed partially on the second FTL 26 and partially on the other surface of the PEM 22.

The FTLs 24, 26 are typically fabricated from a carbon fiber paper or non-woven material or woven cloth. Depending on the product construction, the FTLs 24, 26 can have carbon particle coatings on one side. The FTLs 24, 26, as discussed above, can be fabricated to include or exclude a catalyst coating.

In the particular embodiment shown in FIG. 1b, MEA 25 is shown sandwiched between a first edge seal system 34 and a second edge seal system 36. Adjacent the first and second edge seal systems 34 and 36 are flow field plates 40 and 42, respectively. Each of the flow field plates 40, 42 includes a field of gas flow channels 43 and ports through which hydrogen and oxygen feed fuels pass. In the configuration depicted in FIG. 1b, flow field plates 40, 42 are configured as monopolar flow field plates, in which a single MEA 25 is sandwiched there between. The flow field in this and other embodiments may be a low lateral flux flow field as disclosed in co-pending application Ser. No. 09/954,601, filed Sep. 17, 2001, and incorporated herein by reference.

The edge seal systems 34, 36 provide the necessary sealing within the UCA package to isolate the various fluid (gas/liquid) transport and reaction regions from contaminating one another and from inappropriately exiting the UCA 20, and may further provide for electrical isolation and hard stop compression control between the flow field plates 40, 42. The term "hard stop" as used herein generally refers to a nearly or substantially incompressible material that does not significantly change in thickness under operating pressures and temperatures. More particularly, the term "hard stop" refers to a substantially incompressible member or layer in a membrane electrode assembly (MEA) which halts compression of the MEA at a fixed thickness or strain. A "hard stop" as referred to herein is not intended to mean an ion conducting membrane layer, a catalyst layer, or a gas diffusion layer.

In one configuration, the edge seal systems 34, 36 include a gasket system formed from an elastomeric material. In other configurations, as will be described below, one, two or more layers of various selected materials can be employed to provide the requisite sealing within UCA 20. Other configurations employ an in-situ formed seal system.

Figure 1C:
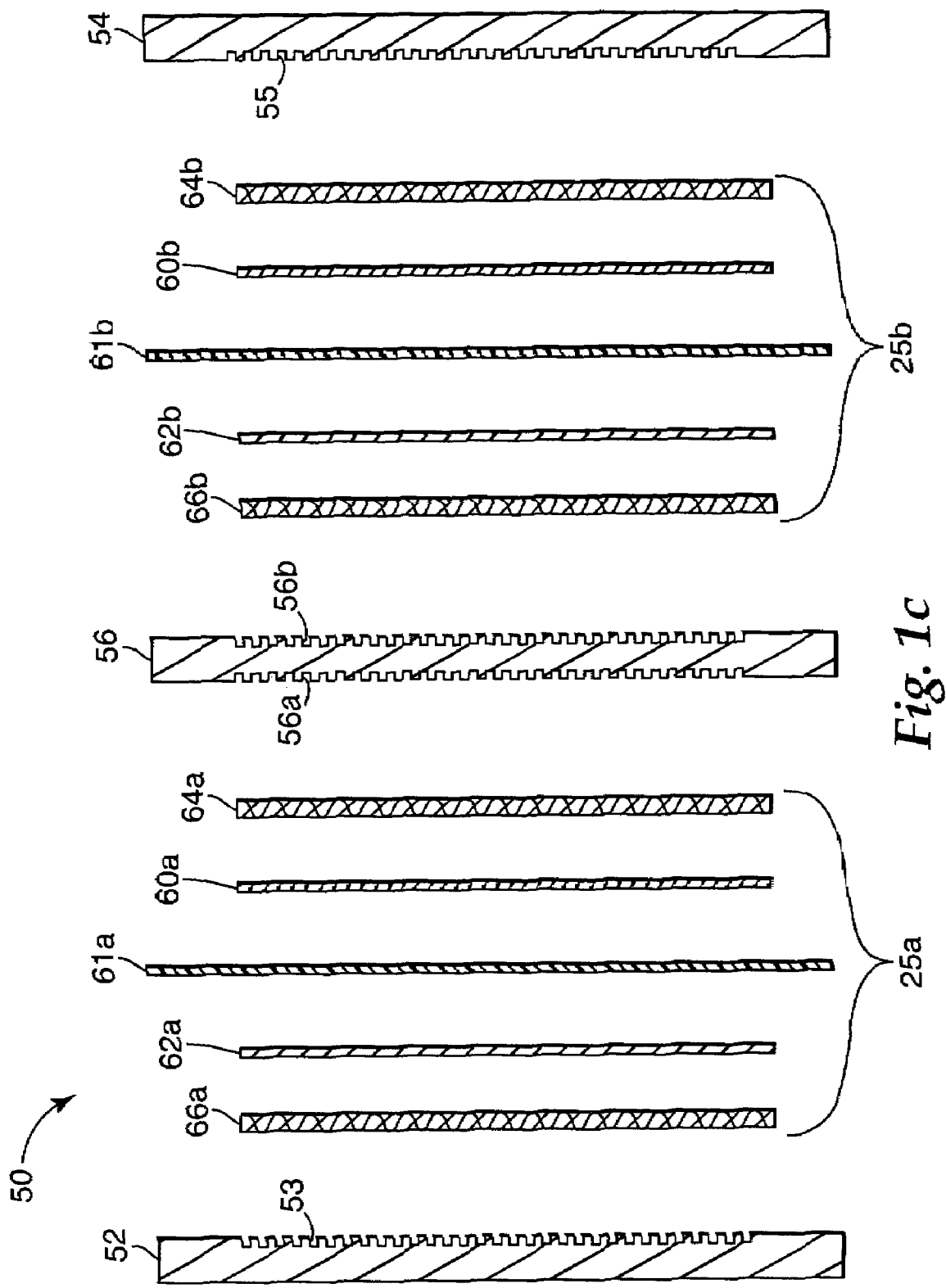
FIG. 1c illustrates a unitized cell assembly having a monopolar/bipolar configuration in accordance with an embodiment of the present invention.

FIG. 1c illustrates a UCA 50 which incorporates multiple MEAs 25 through employment of one or more bipolar flow field plates 56. In the configuration shown in FIG. 1c, UCA 50 incorporates two MEAs 25a and 25b and a single bipolar flow field plate 56. MEA 25a includes a cathode 62a/membrane 61a/anode 60a layered structure sandwiched between FTLs 66a and 64a. FTL 66a is situated adjacent a flow field end plate 52, which is configured as a monopolar flow field plate. FTL 64a is situated adjacent a first flow field surface 56a of bipolar flow field plate 56.

Similarly, MEA 25b includes a cathode 62b/membrane 61b/anode 60b layered structure sandwiched between FTLs 66b and 64b. FTL 64b is situated adjacent a flow field end plate 54, which is configured as a monopolar flow field plate. FTL 66b is situated adjacent a second flow field surface 56b of bipolar flow field plate 56. It will be appreciated that N number of MEAs 25 and N-1 bipolar flow field plates 56 can be incorporated into a single UCA 50. It is believed, however, that, in general, a UCA 50 incorporating one or two MEAs 56 (N=1, bipolar plates=0 or N=2, bipolar plates=1) is preferred for more efficient thermal management.

The UCA configurations shown in FIGS. 1b and 1c are representative of two particular arrangements that can be implemented for use in the context of the present invention. These two arrangements are provided for illustrative purposes only, and are not intended to represent all possible configurations coming within the scope of the present invention. Rather, FIGS. 1b and 1c are intended to illustrate various components that can be selectively incorporated into a unitized fuel cell assembly packaged in accordance with the principles of the present invention.

By way of further example, a variety of sealing methodologies can be employed to provide the requisite sealing of a UCA comprising a single MEA disposed between a pair of monopolar flow field plates, and can also be employed to seal a UCA comprising multiple MEAs, a pair of monopolar flow field plates and one or more bipolar flow field plates. For example, a UCA having a monopolar or bipolar structure can be constructed to incorporate an in-situ formed solid gasket, such as a flat solid silicone gasket.

In particular embodiments, a UCA, in addition to including a sealing gasket, can incorporate a hard stop arrangement. The hard stop(s) can be built-in, disposed internal to the UCA, or integrated into the monopolar and/or bipolar flow field plates. Other features can be incorporated into a UCA, such as an excess gasket material trap channel and a micro replicated pattern provided on the flow field plates. Incorporating a hard stop into the UCA packaging advantageously limits the amount of compressive force applied to the MEA during fabrication (e.g., press forces) and during use (e.g., external stack pressure system). For example, the height of a UCA hard stop can be calculated to provide a specified amount of MEA compression, such as 30%, during UCA construction, such compression being limited to the specified amount by the hard stop. Incorporating a hard stop into the flow field plates can also act as a registration aid for the two flow field plates. Accordingly, a fuel cell assembly of the present invention is not limited to a specific UCA configuration.

Figure 2:
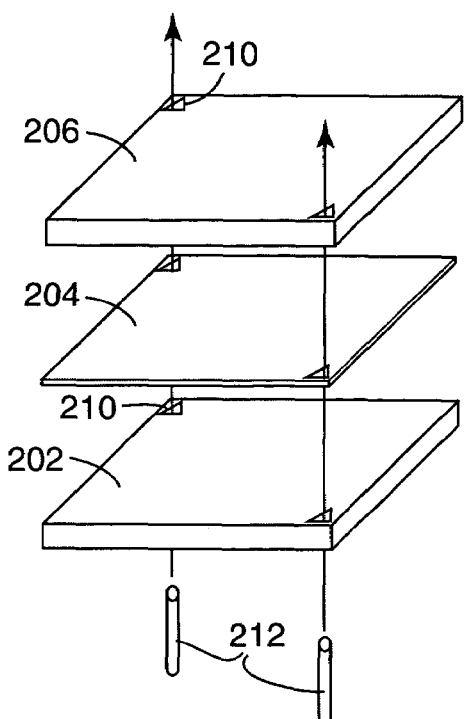
FIGS. 2-6 illustrate embodiments of a registration arrangement incorporating registration posts and registration apertures for aligning fuel cell components and assemblies in accordance with the present invention.

In FIG. 2, there is shown an embodiment of a registration arrangement in accordance with the present invention. The registration arrangement shown in FIG. 2 employs registration posts and registration apertures that provide for inter-cell and intra-cell registration within a fuel cell stack. FIG. 2 shows a first flow field plate 202, a second flow field plate 206, and an MEA 204 positioned there between. Provided at peripheral corners of the first and second flow field plates 202, 206 and MEA 204 are registration apertures 210. In general, the registration apertures 210 are located on the first and second flow field plates 202, 206 and MEA 204 so that the active areas of the MEA 204 are not impinged on by the registration arrangement. In FIG. 2, two such registration apertures 210 are shown. It is understood that more than two registration apertures 210 may be provided, and that the registration apertures 210 may be provided at locations along the peripheral edge of the first and second flow field plates 202, 206 and MEA 204 other than at the peripheral corners.

FIG. 2 further shows registration posts 212 that are dimensioned to pass through registration apertures 210 provided in the first and second flow field plates 202, 206 and MEA 204. As will be discussed in detail below, the registration posts 212 are configured to engage the registration apertures 210 at a number of discrete press-fit locations. Providing a contact interface between registration posts and apertures 212, 210 at two or more discrete press-fit locations provides for increased installation ease (e.g., lower post/ aperture insertion force) and reduced manufacturing tolerance requirements, among other advantages over a conventional press-fit arrangement employing pins and holes having conforming geometry (i.e., continuous circumferential/peripheral contact interface).

When the registration posts 212 are inserted into the respective registration apertures 210, the first and second flow field plates 202, 206 and MEA 204 are brought into precision alignment, which is necessary to ensure proper sealing within and between fuel cell assemblies of a fuel cell stack. Proper alignment of fuel cell components within each fuel cell assembly is critical to ensure efficient operation of the fuel cell system.

Figure 3:
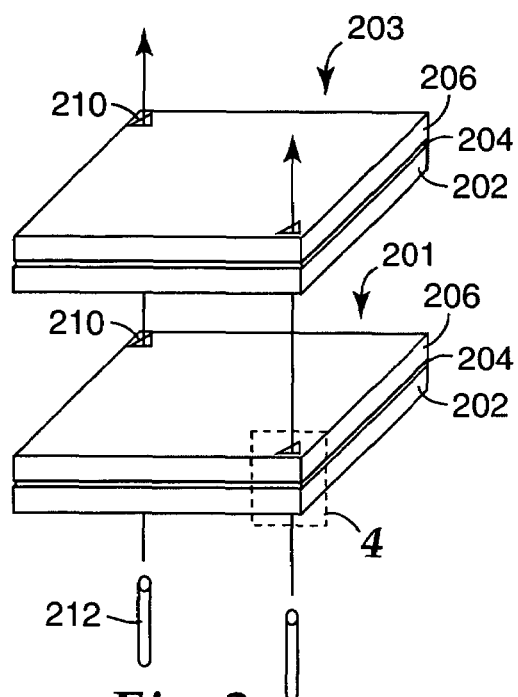

FIG. 3 illustrates inter-cell alignment as between adjacently positioned fuel cell assemblies within a fuel cell stack. FIG. 3 shows a first UCA 201 and a second UCA 203 subject to alignment using a registration approach of the present invention. Each of the UCAs 201, 203 is depicted as having an MEA 204 disposed between a pair of flow field plates 202, 206. Intra-cell component alignment within the first UCA 201 is accomplished by insertion of the registration posts 212 through the registration apertures 210 provided in each of the first and second flow field plates 202, 206 and MEA 204. When properly inserted, the registration posts 212 protrude from the surface of the second flow field plate 206. The protruding registration posts 212 provide an easily perceivable feature for facilitating identification of plate polarity (e.g., anode side or cathode side) and positioning of the next UCA or UCA component to be added to the fuel cell stack.

In the illustrative example shown in FIG. 3, the first flow field plate 202 of UCA 203 is positioned over the UCA 201, such that the registration posts 212 protruding from the second flow field plate 206 of UCA 201 align with the registration apertures 210 of the first flow field plate second UCA 203. In this configuration, when the second UCA 203 is brought into engagement with the first UCA 201, the registration posts 212 protrude into, but not through, the registration apertures 210 of the second UCA 203. Projection of the registration posts 212 of the first UCA 201 into the registration apertures 201 of the second UCA 203 provides for inter-cell registration and alignment between the first and second UCAs 201, 203.

Figure 4:
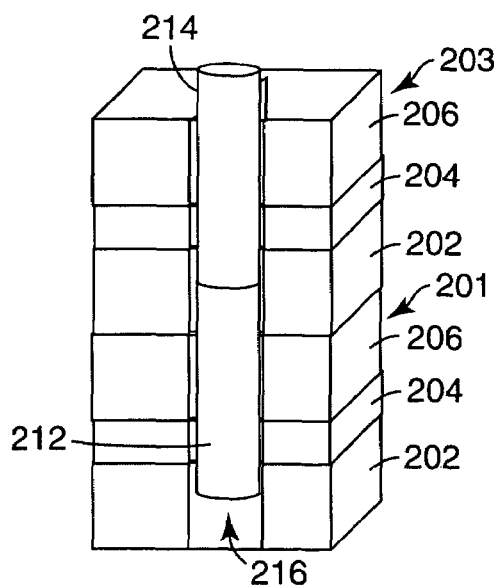

FIG. 4 is an exploded schematic view of the corner portion of FIG. 3 shown in dotted lines. FIG. 4 shows UCA 201 and 203 in an aligned, abutting orientation, with a two registration post 212, 214. A first registration post 212 is shown passing through registration apertures 210 of the first and second flow field plates 202, 206 and MEA 204 of UCA 201. A portion of the first registration post 212 protrudes from the second flow field plate 206 of UCA 201. The first flow plate 202 of UCA 203 is positioned onto UCA 201, such that a portion of the first registration post 212 of UCA 201 protrudes into a portion of the registration aperture 210 (shown as portion 216 for UCA 201) of UCA 203.

A second registration post 214 is inserted into the remaining portion of the registration aperture 210 in the first flow field plate 202 of UCA 203. The registration apertures 210 of MEA 204 and second flow field plate 206 are aligned with the second registration posts 214. When properly installed, the MEA 204 contacts the first flow field plate 202 and second flow field plate 206 contacts the MEA 204 to define the second UCA 203. A portion of the second registration post 214 protrudes from the second flow field plate 206 of UCA 203. The protruding portion of the second registration post 214 may be received by a registration aperture of a first flow field plate of another UCA (not shown) or a recess provided in an end plate (not shown) of the cell stack assembly.

Figure 5:
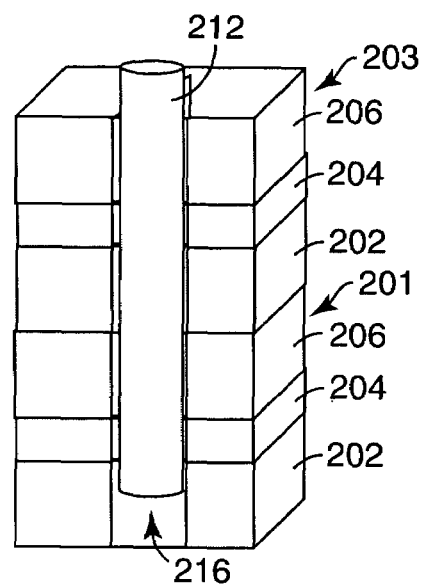

FIG. 5 shows a schematic view of another registration arrangement in which axially aligned registration apertures 210 provided in the components of two or more UCAs 201, 203 may receive a single registration post 212. In the configuration depicted in FIG. 5, a single registration post 212 is shown installed within the registration apertures 210 of two UCAs 201, 203. A portion of the registration post 212 protrudes from UCA 203. This protruding portion of the registration post 212 may be received by registration apertures provided in the components of another pair of UCAs (not shown). It will be appreciated that the length of the registration posts 212 may be selected to provide intra-cell and inter-cell registration between any number of fuel cell components and assemblies. It will be further appreciated that the length of the registration posts 212 may be the same or may vary with regard to a given fuel cell stack assembly.

Figure 6:
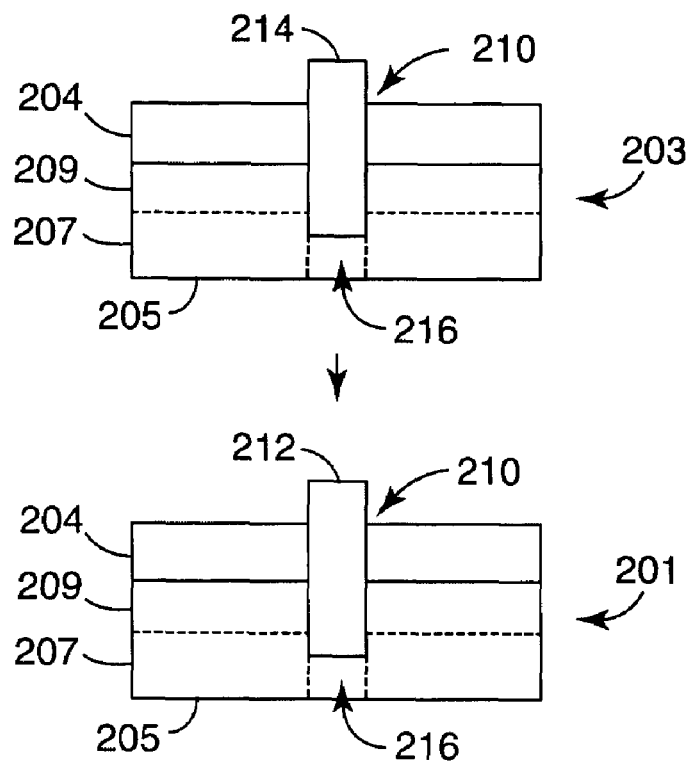

A registration approach of the present invention may be employed to provide alignment within and between fuel cell sub-assemblies. In the context of this approach, a fuel cell sub-assembly represents a subset of components defining a UCA. For example, and with reference to schematic depiction of FIG. 6, a registration arrangement is shown in the context of a fuel cell sub-assembly defined by a single flow field plate 205 and an MEA 204. FIG. 6 shows a first UCA sub-assembly 201 and a second UCA sub-assembly 203, each comprising a flow field plate 205 and MEA 204. As shown, flow field plate 205 has a bipolar configuration, in which upper and lower flow field plates 209, 205 are incorporated into a single plate structure.

Registration posts 212 of UCA sub-assembly 201 are installed within the registration apertures 210 of the flow field plate 205 and MEA 204 to provide intra-cell alignment of these components of UCA sub-assembly 201. The UCA sub-assembly 203 is positioned on UCA sub-assembly 201 such that the protruding portion of the registration posts 212 are received by a portion 216 of flow field plate 205 of UCA sub-assembly 210. The protruding portion of the second registration posts 214 may be received by registration apertures 210 of a flow field plate 205 of another UCA sub-assembly (not shown) or recesses provided in an end plate (not shown) of the cell stack assembly.

As was discussed previously, the registration posts and corresponding registration apertures are configured to matingly engage at a number of discrete press-fit locations. A contact interface having discrete press-fit engagement locations may be achieved by use of registration apertures having a geometry that differs from that of the registration posts. This non-conforming geometric relationship between registration apertures and posts provides for enhanced flexibility in the design of the contact interface, increased installation ease owing to reduced post/aperture insertion force, and lower manufacturing tolerance requirements over conventional press-fit arrangements.

In general terms, a registration arrangement of the present invention is achieved by use of registration posts having a shape that differs from that of registration apertures implemented to received the registration posts. More particularly, each of the registration posts has an outer surface that differs in shape from a shape of the inner surface of the registration apertures. This difference in contact surface profile provides for a contact interface having a number of discrete press-fit locations.

In one configuration, the shape of at least one of the inner surface of the registration apertures and the outer surface of the registration posts may, for example, define a convex curved shape. The shape of at least one of the inner surface of the registration apertures and the outer surface of the registration posts may also define a generally curved shape comprising a two or more concave or protruding portions. In another configuration, the shape of at least one of the inner surface of the registration apertures and the outer surface of the registration posts may define a circular or an elliptical shape. For example, the shape of one of the inner surface of the registration apertures and the outer surface of the registration posts may define a circle, and the shape of the other of the inner surface of the registration apertures and the outer surface of the registration posts may define an ellipse.

The shape of at least one of the inner surface of the registration apertures and the outer surface of the registration posts may define a polygon. For example, the shape of one of the inner surface of the registration apertures and the outer surface of the registration posts may define a first polygon, and the shape of the other of the inner surface of the registration apertures and the outer surface of the registration posts may define a second polygon. By way of further example, the shape of one of the inner surface of the registration apertures and the outer surface of the registration posts may define a polygon, and the shape of the other of the inner surface of the registration apertures and the outer surface of the registration posts may define a circle or an ellipse. The shape of the inner surface of the registration apertures may also define a triangle, and the outer surface of the registration posts may define a circle. Other illustrative registration post configurations include those having a tapered shape or a wedge shape.

In one particular configuration, the shape of the inner surface of the registration apertures may define a circle, and the registration posts may define a core member with several protrusions outwardly projecting from the core member. The registration posts can comprise a solid core member or a hollow core member. For example, the registration posts may comprise a hollow outer member and a solid core member, wherein the hollow outer member is configured to receive the solid core member.

In another approach, the registration posts comprise a compressible hollow outer member and a solid core member. The solid core member has an outer diameter greater than an inner diameter of the hollow outer member. The solid core member compressibly deforms the hollow outer member when the solid core member is positioned within the hollow outer member.

FIGS. 7-14 depict a variety of registration arrangements that provide for a contact interface having discrete press-fit engagement locations between registration posts and apertures, such as those discussed above. It is understood that these configurations are provided for non-limiting illustrative purposes only, and that a myriad of other shapes, sizes, and engagement configurations that provide for discrete press-fit contact locations between registration posts and apertures are contemplated.

Figure 7:
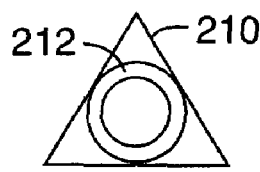
FIGS. 7-14 show various illustrative configurations of registration posts and registration apertures for aligning fuel cell components and assemblies in accordance with the present invention.
Figure 8:
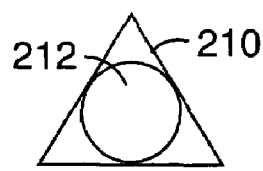

FIGS. 7 and 8 illustrate a registration arrangement defined by a registration aperture 210 having a triangular shape and a registration post 212 having a circular shape. This registration arrangement provides for three discrete press-fit locations between the registration aperture 210 and post 212. In FIG. 7, the registration post 212 is hollow, which provides for greater compression of the registration post 212 within the registration aperture 210. Use of a hollow registration post 212 also provides for reduced manufacturing tolerance requirements. In one particular configuration, a solid or otherwise rigid member may be inserted into the hollow registration post 212 of FIG. 7 to enhance positional alignment within and between UCAs.

Figure 9:
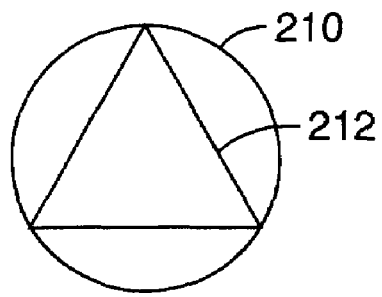
Figure 10:
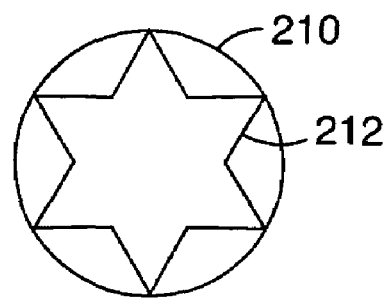
Figure 11:
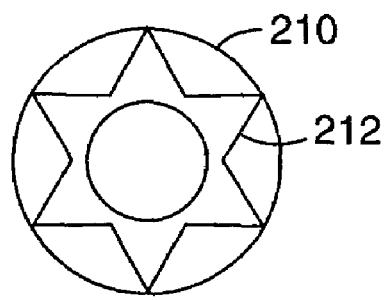
Figure 12:
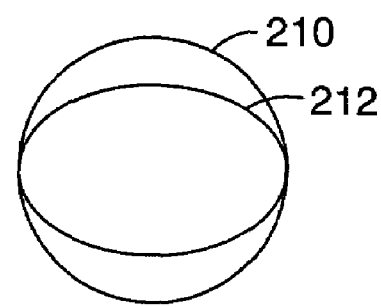
Figure 13:
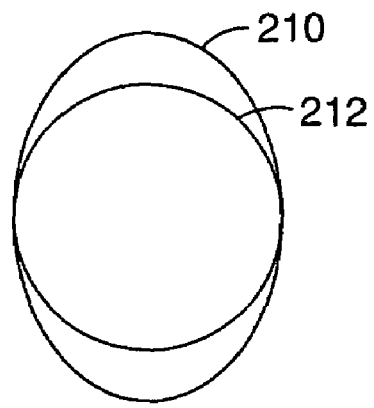
Figure 14:
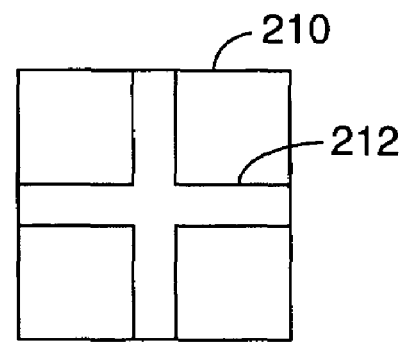

FIGS. 9-14 show a variety of registration arrangements having varying configurations. FIG. 9 illustrates a registration arrangements defined by a registration aperture 210 having a circular cross-section and a registration post 212 having a triangular cross-section. FIGS. 10 and 11 depict a registration aperture 210 having a circular cross-section and a registration post 212 having a star cross-section. The registration post 212 in FIG. 10 is solid, while the registration post 212 in FIG. 11 is hollow. FIG. 12 shows a registration aperture 210 having a circular cross-section and a registration post 212 having an elliptical cross-section. FIG. 13 shows a registration aperture 210 having an elliptical cross-section and a registration post 212 having a circular cross-section. FIG. 14 illustrates a registration aperture 210 having a square cross-section and a registration post 212 having a cross shaped cross-section.

Figure 15:
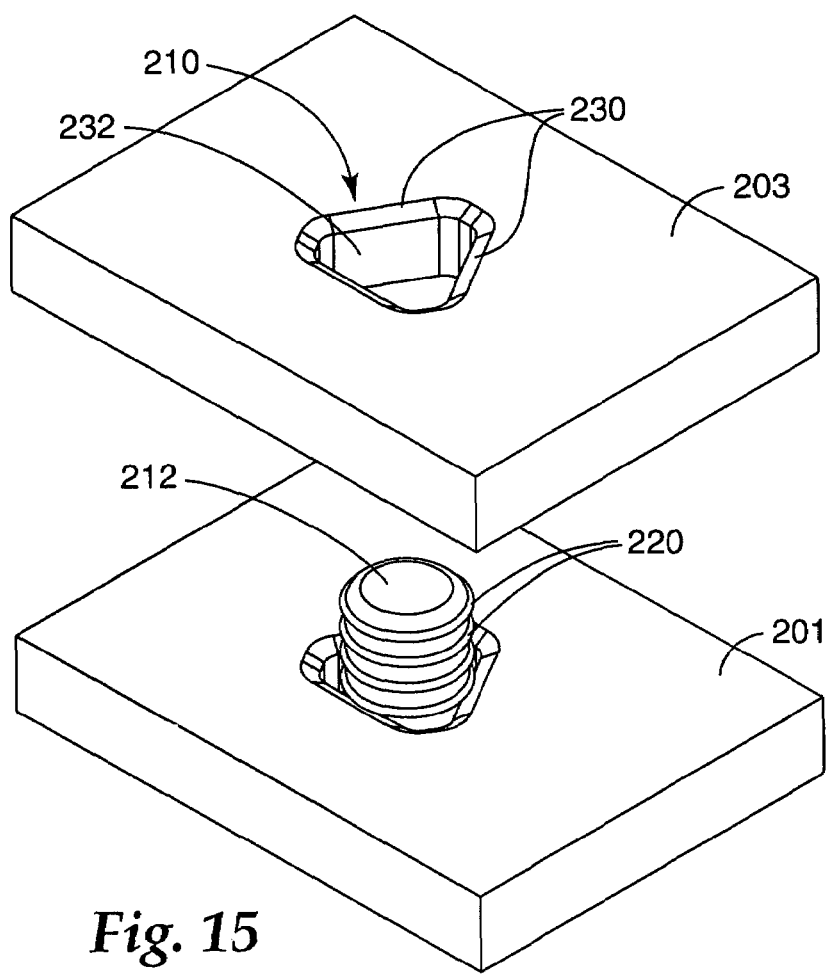
FIGS. 15-17 illustrate an embodiment of a registration arrangement incorporating registration posts and registration apertures for aligning fuel cell components and assemblies in accordance with the present invention.
Figure 16:
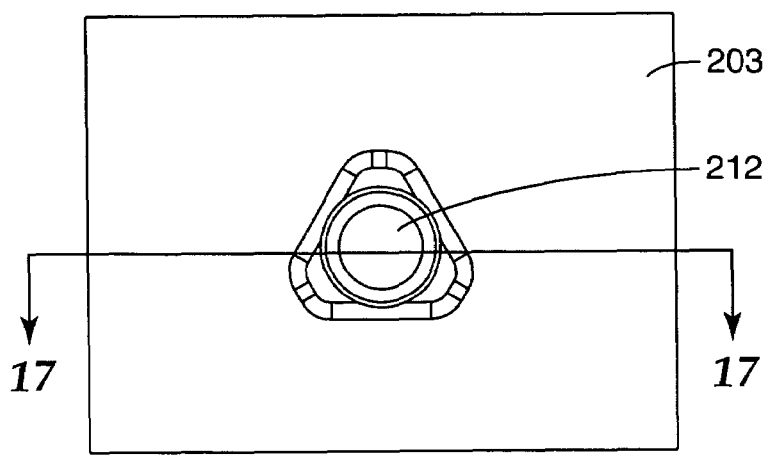
Figure 17:
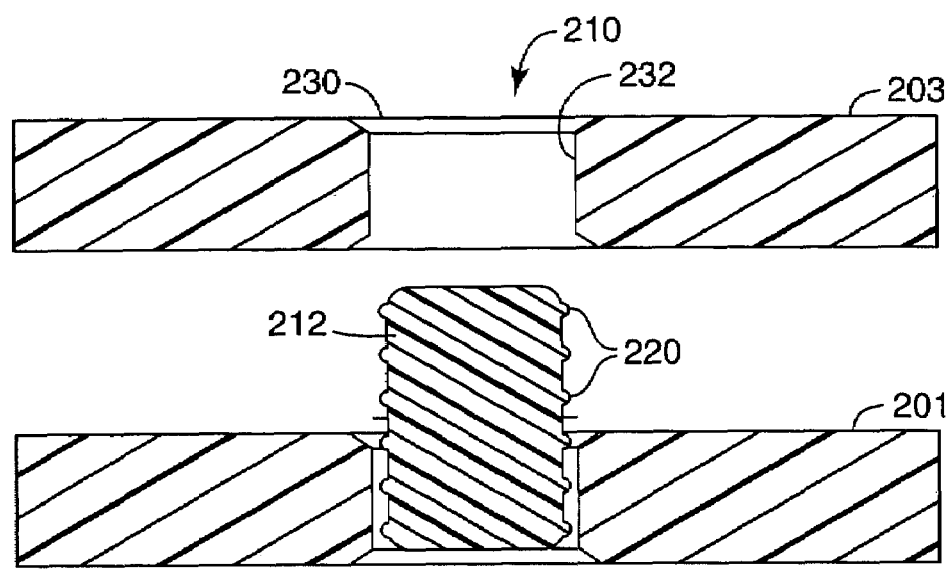

Turning now to FIGS. 15-17, there is shown an embodiment of a registration arrangement defined between two UCAs 201, 203. In this embodiment, a first and second UCA 201, 203 each incorporate a triangular shaped registration aperture 210. Each registration aperture 210 is shown to include a lead-in 230 in an entrance and exit portion of the aperture 210. The lead-in 230 is shown as the sloped region at the entrance and exit portions of the aperture 210, between which a contact region 232 is defined. In this configuration, the lead-ins 230 are chamfer lead-ins. The contact region 232 is dimensioned to engage the registration post 212. In this configuration, the registration post 212 includes a core portion and a ribbed portion 220. The ribs 220 are preferably compliant so that they compress when the registration post 212 is inserted into the registration aperture 210. The ribs 220 are preferably spaced so that two or more ribs 220 are in contact with the contact region 232 when the registration post 212 is installed within the registration aperture 210.

Figure 18:
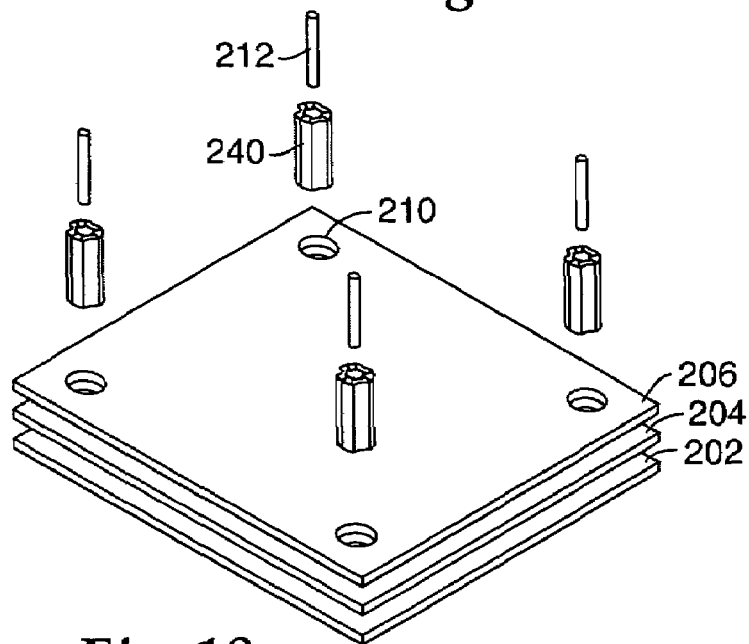
FIGS. 18 and 19 illustrate an embodiment of a registration arrangement incorporating registration posts, registration inserts, and registration apertures for aligning fuel cell components and assemblies in accordance with the present invention.
Figure 19:
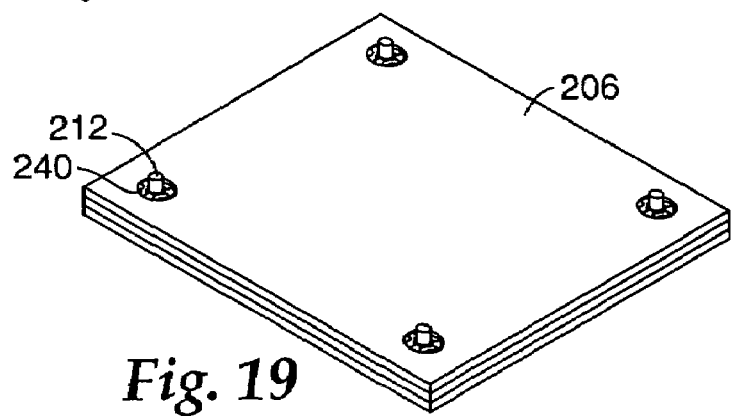

FIGS. 18 and 19 illustrate another embodiment of a registration arrangement of the present invention. In this arrangement, the registration apertures 210 provided in the first and second flow field plates 202, 206 and the MEA 204 are dimensioned to receive a multi-part registration post arrangement comprising a hollow registration insert 240 and a registration post 212. The registration insert 240 has a cross-sectional shape that differs from that of the registration aperture 210.

According to one assembling approach, the registration apertures 210 of the first and second flow field plates 202, 206 and the MEA 204 are axially aligned, and a registration insert 240 is advanced into the respective registration apertures 210. The registration post 212 is inserted into the registration insert 240 which compresses the registration insert 240 against the inner wall of the registration aperture 210. FIG. 19 shows installation of four registration inserts 240 and posts 212 in corresponding registration apertures 210. As shown, each of the registration posts 212 protrude from the second flow field plate 206 and may be received by registration inserts 240 of an adjacently positioned UCA. Although only the registration posts 212 are shown protruding from the second flow field plate 206, is may be desirable to configure the registration inserts 240 to protrude from the second flow field plate 206, exclusive of or in addition to the registration posts 212.

Figure 20:
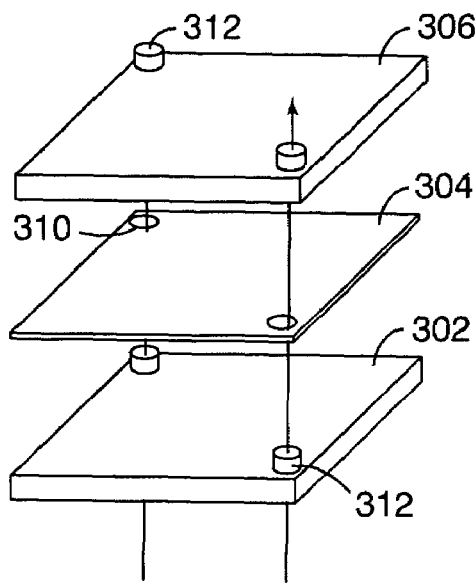
FIGS. 20-22 illustrate an embodiment of a registration arrangement incorporating registration posts and registration recesses molded into flow field plates for aligning fuel cell components and assemblies in accordance with the present invention.
Figure 21:
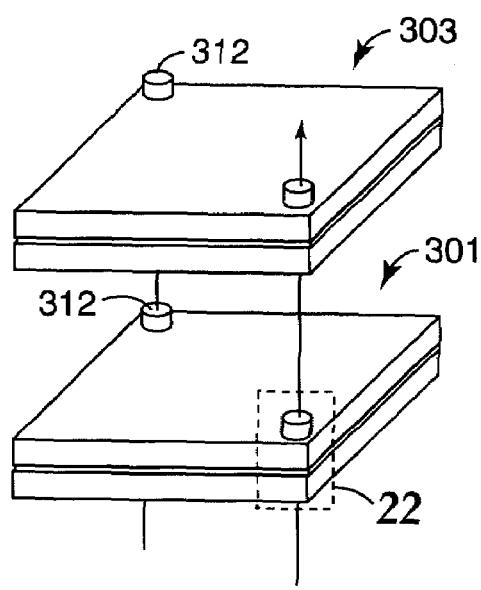
Figure 22:
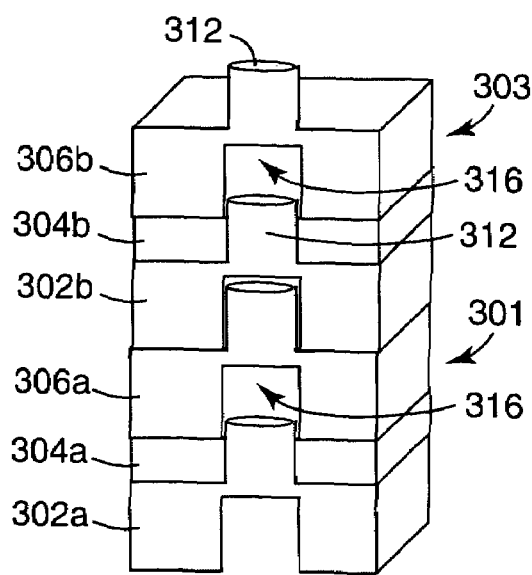

FIGS. 20-22 illustrate another embodiment of a registration approach in accordance with the present invention. FIG. 22 is a more detailed schematic view of the registration arrangement of FIGS. 20 and 21. According to this embodiment, registration arrangements are molded into the flow field plates. The molded registration posts and recesses according to this embodiment provide for intra-cell and inter-cell registration of fuel cell assemblies and sub-assemblies of a fuel cell stack. Use of molded registration arrangements obviates the secondary assembly process of inserting registration posts into corresponding registration apertures during fuel cell component assembly.

As is shown in FIGS. 20-22, registration posts 312 and registration recesses 316 are molded directly into the flow field plates 302, 306. The registration posts 312 of a first flow field plate 302a align with, and pass through, registration apertures 310 provided in an MEA 304a of UCA 301 (shown in FIGS. 21 and 22). The registration posts 312 of the first flow field plate 302a are received by registration recesses 316 of a second flow field plate 306a of UCA 301. The registration posts 312 of the second flow field plate 306a protrude from UCA 301 and provide a visually perceivable positioning and polarity identification feature for adding another UCA, e.g., UCA 303, to the fuel cell stack that includes UCA 301.

A first flow field plate 302b of UCA 303 is moved into contact with the second flow field plate 306a of UCA 301, such that the registration recesses 316 of the second flow field plate 306a of UCA 303 receive the registration posts 312 protruding from UCA 301. The registration posts 312 of the first flow field plate 302b align with, and pass through, registration apertures 310 provided in an MEA 304b of UCA 303 (shown in FIGS. 21 and 22). The registration posts 312 of the first flow field plate 302b are received by registration recesses 316 of a second flow field plate 306b of UCA 303. The registration posts 312 of the second flow field plate 306b protrude from UCA 303 and provide a visually perceivable positioning and polarity identification feature for adding another UCA (not shown) to the fuel cell stack that includes UCAs 301 and 303.

Figure 23:
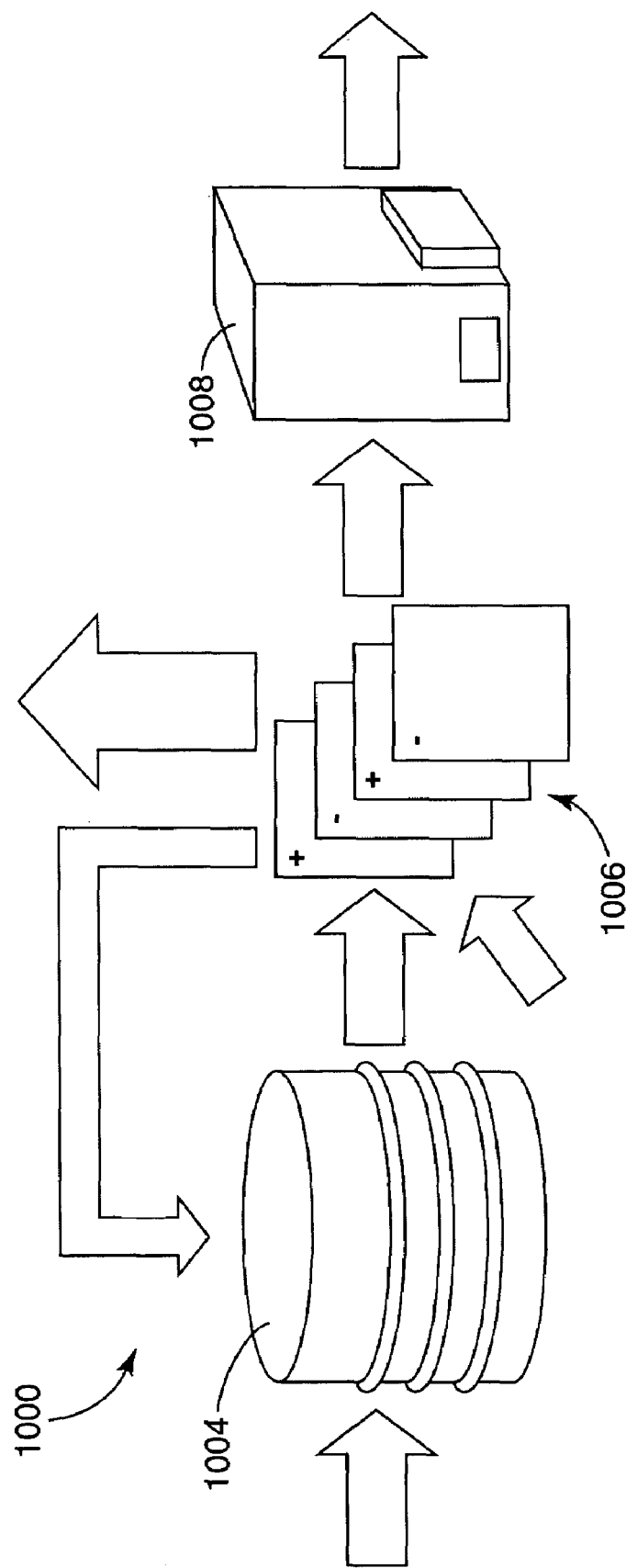
FIGS. 23-26 illustrate fuel cell systems within which one or more fuel cell stacks employing registration arrangements of the present invention may be employed.

FIGS. 23-26 illustrate various fuel cell systems for power generation that may incorporate fuel cell assemblies having registration arrangements as described herein. The fuel cell system 1000 shown in FIG. 23 depicts one of many possible systems in which a fuel cell assembly as illustrated by the embodiments herein may be utilized.

The fuel cell system 1000 includes a fuel processor 1004, a power section 1006, and a power conditioner 1008. The fuel processor 1004, which includes a fuel reformer, receives a source fuel, such as natural gas, and processes the source fuel to produce a hydrogen rich fuel. The hydrogen rich fuel is supplied to the power section 1006. Within the power section 1006, the hydrogen rich fuel is introduced into the stack of UCAs of the fuel cell stack(s) contained in the power section 906. A supply of air is also provided to the power section 1006, which provides a source of oxygen for the stack(s) of fuel cells.

The fuel cell stack(s) of the power section 1006 produce DC power, useable heat, and clean water. In a regenerative system, some or all of the byproduct heat can be used to produce steam which, in turn, can be used by the fuel processor 1004 to perform its various processing functions. The DC power produced by the power section 1006 is transmitted to the power conditioner 1008, which converts DC power to AC power for subsequent use. It is understood that AC power conversion need not be included in a system that provides DC output power.

Figure 24:
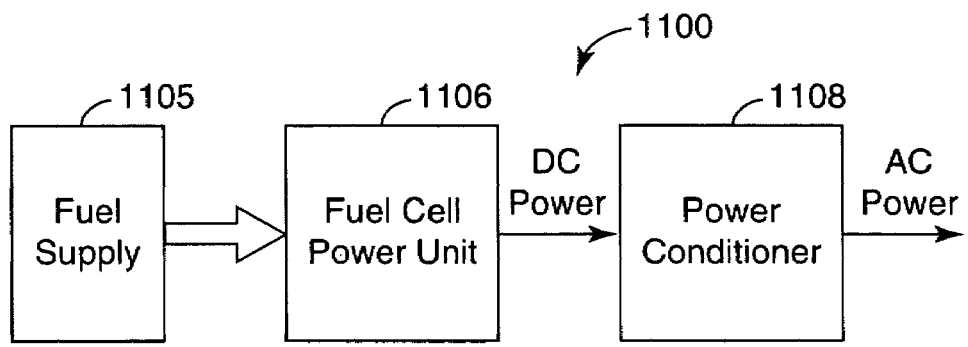

FIG. 24 illustrates a fuel cell power supply 1100 including a fuel supply unit 1105, a fuel cell power section 1106, and a power conditioner 1108. The fuel supply unit 1105 includes a reservoir that contains hydrogen fuel which is supplied to the fuel cell power section 1106. Within the power section 1106, the hydrogen fuel is introduced along with air or oxygen into the UCAs of the fuel cell stack(s) contained in the power section 1106.

The power section 1106 of the fuel cell power supply system 1100 produces DC power, useable heat, and clean water. The DC power produced by the power section 1106 may be transmitted to the power conditioner 1108, for conversion to AC power, if desired. The fuel cell power supply system 1100 illustrated in FIG. 24 may be implemented as a stationary or portable AC or DC power generator, for example.

Figure 25:
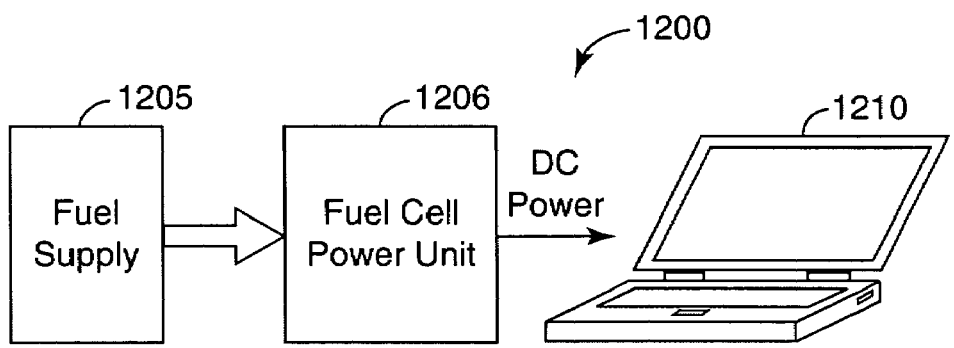

In the implementation illustrated in FIG. 25, a fuel cell system uses power generated by a fuel cell power supply to provide power to operate a computer. As described in connection with FIG. 25, fuel cell power supply system includes a fuel supply unit 1205 and a fuel cell power section 1206. The fuel supply unit 1205 provides hydrogen fuel to the fuel cell power section 1206. The fuel cell stack(s) of the power section 1206 produce power that is used to operate a computer 1210, such as a desk top or laptop computer.

Figure 26:
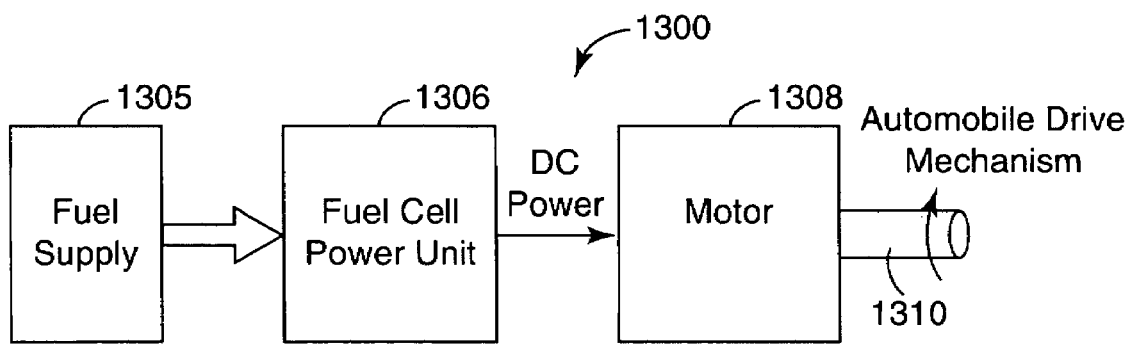

In another implementation, illustrated in FIG. 26, power from a fuel cell power supply is used to operate an automobile 1310. In this configuration, a fuel supply unit 1305 supplies hydrogen fuel to a fuel cell power section 1306. The fuel cell stack(s) of the power section 1306 produce power used to operate a motor 1308 coupled to a drive mechanism of the automobile 1310.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A fuel cell stack assembly, comprising:
a plurality of fuel cell assemblies, each of the fuel cell assemblies comprising:
a first flow field plate;
a second flow field plate; and a membrane electrode assembly (MEA) provided between the first and second flow field plates and having an active area;

a plurality of registration apertures defined in each of the MEA, the first flow field plate, and the second flow field plate, the respective registration apertures situated within non-active areas of the MEA when the first and second flow field plates and the MEA are axially aligned within the stack assembly, the registration apertures having an inner surface; and a plurality of registration posts configured for reception within the plurality of registration apertures, each of the registration posts having an outer surface differing in shape from a shape of the inner surface of the registration apertures, the inner surface of the registration apertures contacting the outer surface of the registration posts at a plurality of discrete press-fit locations, wherein the registration posts comprise a hollow outer member and a solid core member, the hollow outer member configured to receive the solid core member.

2. A fuel cell stack assembly, comprising:

a plurality of fuel cell assemblies, each of the fuel cell assemblies comprising:
 a first flow field plate;
 a second flow field plate; and
 a membrane electrode assembly (MEA) provided between the first and second flow field plates and having an active area;

a plurality of registration apertures defined in each of the MEA, the first flow field plate, and the second flow field plate, the respective registration apertures situated within non-active areas of the MEA when the first and second flow field plates and the MEA are axially aligned within the stack assembly, the registration apertures having an inner surface; and a plurality of registration posts configured for reception within the plurality of registration apertures, each of the registration posts having an outer surface differing in shape front a shape of the inner surface of the registration apertures, the inner surface of the registration apertures contacting the outer surface of the registration posts at a plurality of discrete press-fit locations, wherein the registration posts comprise a compressible hollow outer member and a solid core member, the solid core member having an outer diameter greater than an inner diameter of the hollow outer member, the solid core member compressibly deforming the hollow outer member when the solid core member is positioned within the hollow outer member.

3. A fuel cell sub-assembly for incorporation in a fuel cell stack assembly, comprising:

a flow field plate;

a membrane electrode assembly (MEA) positioned adjacent the flow field plate and having an active area;

a plurality of registration apertures defined in each of the flow field plate and the MEA, the respective registration apertures situated within non-active areas of the MEA when the flow field plate and the MEA are in axial alignment, the registration apertures having an inner surface; and a plurality of registration posts configured for reception within the plurality of registration apertures, each of the registration posts having an outer surface differing in shape from a shape of the inner surface of the registration apertures, the inner surface of the registration apertures contacting the outer surface of the registration posts at a plurality of discrete press-fit locations, wherein the registration posts comprise a hollow outer member and a solid core member, the hollow outer member configured to receive the solid core member.

4. A method of forming a fuel cell stack assembly, comprising:

providing a first flow field plate, a second flow field plate, and a membrane electrode assembly (MEA) having an active area, a plurality of registration apertures defined in each of the MEA, the first flow field plate, and the second flow field plate;

aligning the first and second flow field plates and the MEA so that the respective registration apertures are in axial alignment, the registration apertures having an inner surface;

providing a plurality of registration posts having an outer surface differing in shape from a shape of the inner surface of the registration apertures; and inserting the plurality of registration posts into the plurality of registration apertures so that the inner surface of the registration apertures contact the outer surface of the registration posts at a plurality of discrete press-fit locations, wherein the registration posts each comprise a hollow outer member and a solid core member, the method further comprising inserting the hollow outer members into the registration apertures and inserting the solid core members into the hollow outer members.

5. A method of forming a fuel cell stack assembly, comprising:

providing a first flow field plate, a second flow field plate, and a membrane electrode assembly (MEA) having an active area, a plurality registration apertures defined in each of the MEA, the first flow field plate, and the second flow field plate;

aligning the first and second flow field plates and the MEA so that the respective registration apertures are in axial alignment, the registration apertures having an inner surface;

providing a plurality of registration posts having an outer surface differing in shape from a shape of the inner surface of the registration apertures; and inserting the plurality of registration posts into the plurality of registration apertures so that the inner surface of the registration apertures contact the outer surface of the registration posts at a plurality of discrete press-fit locations, wherein the registration posts each comprise a hollow outer member and a solid core member, the solid core member having an outer diameter greater than an inner diameter of the hollow outer member, the method further comprising inserting the hollow outer members into the registration apertures and inserting the solid core members into the hollow outer members to compressibly deform the hollow outer members.

* * * * *

UNITED STATES PATENT AND TRADEMARK OFFICE
CERTIFICATE OF CORRECTION

PATENT NO. : 7,297,428 B2  
APPLICATION NO. : 10/699454  
DATED : November 20, 2007  
INVENTOR(S) : Kim B. Saulsbury Page 1 of 1

It is certified that error appears in the above-identified patent and that said Letters Patent is hereby corrected as shown below:

Title Page
Item [56], References Cited; Foreign Patent Documents;
  delete "0 981 172" and insert -- 0 981 175 -- therefore.

Column 13
Line 29; delete "to received" and insert -- to receive -- therefore.

Column 17
Claim 2, Line 39; delete "front" and insert -- from -- therefore.

Column 18
Claim 5, Line 38; delete "plurality" and insert -- plurality of -- therefore.

Signed and Sealed this

Twenty-ninth Day of April, 2008

JON W. DUDAS  
*Director of the United States Patent and Trademark Office*